United States Patent [19]

Zahid

[11] 4,274,446

[45] Jun. 23, 1981

[54] LOW COST REPAIRABLE ACCUMULATOR

[75] Inventor: Abduz Zahid, Los Angeles, Calif.

[73] Assignee: Greer Hydraulics, Incorporated, Chatsworth, Calif.

[21] Appl. No.: 87,656

[22] Filed: Oct. 24, 1979

[51] Int. Cl.$^{3}$ .......... F16L 55/04

[52] U.S. Cl. .......... 138/30; 220/85 B

[58] Field of Search .......... 138/26, 30; 220/85 B

[56] References Cited

U.S. PATENT DOCUMENTS

| | | | |
|---|---|---|---|
| 3,654,964 | 4/1972 | Mercier et al. | 138/30 |
| 3,960,178 | 6/1976 | Mercier | 138/30 |
| 3,960,179 | 6/1976 | Zahid | 138/30 |

*Primary Examiner*—James E. Bryant, III

*Attorney, Agent, or Firm*—Arthur B. Colvin

[57] ABSTRACT

A low cost repairable accumulator device having an effective seal defined between an end cap carrying the gas charging valve assembly and the remaining components of the pressure vessel without the use of O-rings or like auxiliary sealing members. The bladder assembly incorporates integral protuberances which coact with portions of the pressure vessel and/or the end cap to achieve the desired seals.

4 Claims, 4 Drawing Figures

FIG. 1
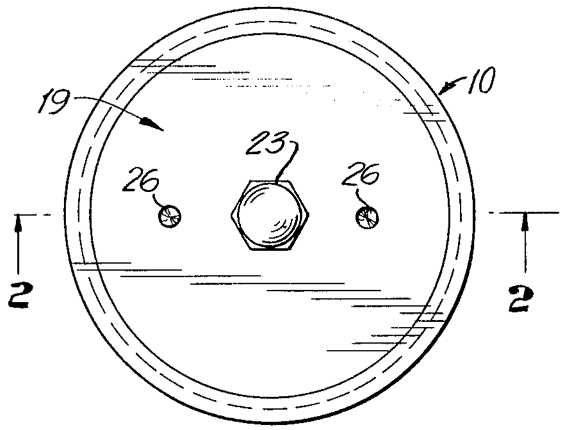
FIG. 2
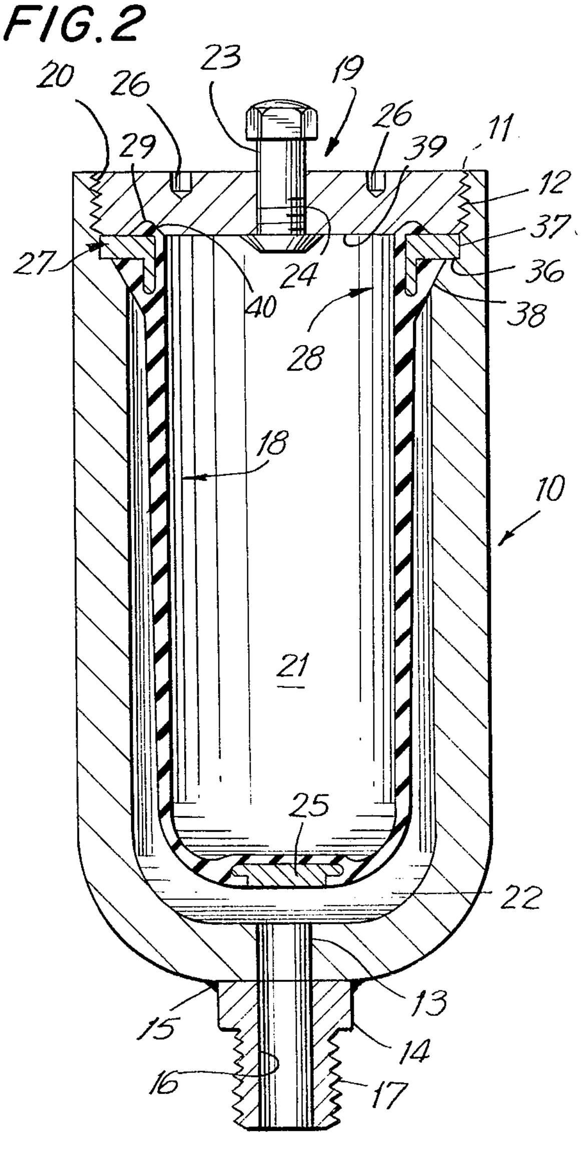
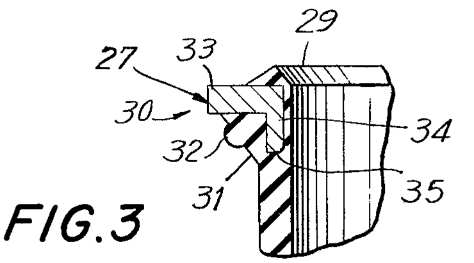
FIG. 3
FIG. 4
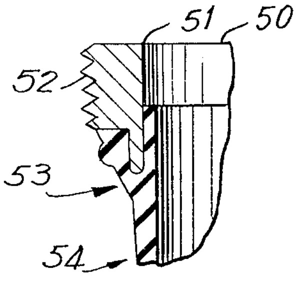

LOW COST REPAIRABLE ACCUMULATOR

BACKGROUND OF THE INVENTION

Field of the Invention

The present invention is in the field of accumulator devices and pertains more particularly to an accumulator device having a replaceable bladder assembly.

The Prior Art

Accumulator devices are employed in a multiplicity of installations wherein it is desired to store energy and/or dampen pulses within a hydraulic system. Accumulator devices typically comprise a pressure vessel having an oil port at one end and a gas charging port at the other, the interior of the pressure vessel being divided into two chambers by an expansible bladder assembly.

Typically, known accumulator devices incorporate a pressure vessel comprised of two or more sections which are permanently interconnected after positioning of the bladder, such connection being accomplished by a welding or the like. Obviously, in the event that the bladder is compromised, the entire accumulator device must be disposed of.

Attempts have been made to provide a repairable accumulator device utilizing a pressure vessel, an end wall of which is comprised of a removable cap member or the like threadably connected to the remainder of the pressure vessel. Such construction permits, in the event of damage to the bladder, removal of the end wall and substitution of a further bladder assembly.

Significant problems have inhered in accumulator devices of the bladder replaceable type as hereinabove described, particularly in the formation of a dependable seal resistant to leakage under the extreme pressures encountered in operation.

As will be readily recognized, any scarring or misfinishing present in the pressure vessel at the point of engagement with the seals is likely to result in a compromise of the seal under the pressure conditions encountered in normal operation.

Attempts have been made in repairable accumulator devices of the type described to provide a system of grooves and O-rings in the respective mating parts, which system will assure a pressure-tight seal. However, the machining of grooves, employment of O-rings and the like significantly increase the cost of the accumulators and complicate the assembly procedures thereof. Moreover, where O-rings are employed, great care must be taken in the course of assembling the rigid components between which the O-rings are disposed since, if the components are carelessly assembled, the O-ring or rings which are subjected to shearing forces between surfaces having predetermined clearance may be damaged, with the result that they are rendered susceptible to leakage.

SUMMARY OF THE INVENTION

The present invention may be summarized as directed to an improved low cost repairable accumular device characterized in that the bladder assembly is itself provided with elements or projections which function to effect dependable seals with the metallic parts between which they are disposed. Unlike O-ring seals, which are positioned between parts having predetermined clearances and are thus subject to compromise in the course of positioning, the structure of the present invention employs a sealing arrangement wherein the resilient components defining the seal incorporate a large clearance in the course of their positioning, which clearance is progressively reduced, and eliminated in the course of final assembly.

Accordingly, it is an object of the invention to provide an improved low cost repairable accumulator device of simple construction, characterized in that the bladder assembly includes one or more readily deformable projecting portions which, in the course of assembly, are deformed or deflected into intimate sealing relationship with other portions of the pressure vessel.

A further object of the present invention is the provision of an accumulator device of the type described which includes a pressure vessel, a cap member therefor, and a bladder assembly adapted to be mounted within the vessel and retained in mounted position by tightening of the cap, such tightening action also deflecting portions integral with the bladder assembly into sealing engagement with other portions of the pressure vessel.

To attain these objects and such further objects as may appear herein or be hereinafter pointed out, reference is made to the accompanying drawings, forming a part hereof in which:

FIG. 1 is a top plan view of an accumulator assembly in accordance with the invention;

FIG. 2 is a vertical section taken on the lines 2—2 of FIG. 1;

FIG. 3 is a fragmentary sectional view through portions of the bladder assembly prior to the mounting thereof within the pressure vessel.

FIG. 4 is a section similar to FIG. 3 of a modified embodiment of the invention.

Referring now to the drawings, the accumulator of the present invention comprises a pressure vessel 10 having an open mouth portion 11 internally threaded as at 12. An oil port 13 is formed at the lower end of the vessel. A nipple 14 is connected to the lower end of the pressure vessel, as by an annular weld 15, the nipple 14 including an internal bore 16 providing a continuation of the oil port, an external thread portion 17 enabling the unit to be connected to a conduit or the like.

A bladder assembly 18 is mounted within the pressure vessel through the open mouth portion 11, a cap assembly 19 having an external thread 20 mating with the thread portion 12 supporting the bladder assembly in position.

It will be understood that the bladder assembly 18 divides the interior of the pressure vessel into two chambers, namely, chamber 21 defining a gas chamber, and chamber 22 defining an oil chamber.

The cap assembly 19 includes a gas charging valve 23 which incorporates a one-way valve (not shown), the valve assembly 23 being disposed in a bore 24 in the cap assembly and providing means for charging the chamber 21 with gas under pressure.

The bladder assembly may include a rigid button or valve member 25 for seating against the innermost terminal end of the oil port 13.

The cap assembly 19 may include sockets 26, 26 for reception of a spanner wrench or like tightening tool.

The bladder assembly in accordance with the invention as disclosed in the embodiment of FIGS. 1 to 3 includes an annular mounting ring 27, which is generally right angular in transverse section, is formed of a rigid metallic material about which the thickened rim portion 28 of the bladder is molded in situ.

Referring now to FIG. 3 which shows the upper end of the bladder assembly in its unstressed form, it will be apparent that the thickened rim portion 28 includes an annular, upwardly directed projection portion 29. Similarly, the bladder, in the area 30 below the annular ring 27, is beveled in the area 31 but incorporates a radially extending annular protuberance 32 approximately midway of the beveled portion 31.

The ring 27 includes a flange 33 projecting radially beyond the thickest portion of the rim of the bladder, and a downwardly directed leg 34, the lowermost edge 35 of which is disposed at a level below the lowermost edge of the protuberance 32.

The pressure vessel 10 includes an upwardly directed shoulder 36 at the base of a cylindrical portion 37. The internal diameter of the cylindrical bore portion 37 matches, with minimal clearances, the external diameter of the flange 33.

The pressure vessel includes an annular chamfered or tapered portion 38 extending from the shoulder 36 downwardly and inwardly toward the axis of the pressure vessel, the angle of the chamfer matching essentially the angle of the beveled portion 31 of the thickened rim portion of the bladder.

In accordance with the embodiment of FIGS. 1 to 3, the undersurface 39 of the cap assembly 19 is formed with a downwardly directed annular groove 40, configured to receive the upwardly facing portion 29.

Assembly of the components is effected by inserting the bladder into position through the open mouth portion. The bladder will be subject to being sleeved downwardly into the pressure vessel until the protuberance 32 of the thickened portion 30 of the bladder engages against the chamfered portion 38 of the pressure vessel. With the parts thus positioned, the flange 33 of the mounting ring 27 will have its under surface spaced a distance above the stop shoulder 36 formed on the pressure vessel. It should be observed that no portion of the bevel area 31 of the bladder assembly is engaged against any portion of the chamfered area 38 of the pressure vessel.

With the parts positioned as described, the cap assembly 19 is downwardly threaded into position. With progressive tightening of the cap assembly, the flange 33 will be driven toward the stop shoulder 36 of the pressure vessel, continued tightening of the cap assembly resulting in a metal-to-metal contact between the shoulder 36, flange 33 and peripheral downwardly directed portions of the under surface of the cap.

In the course of such tightening movement the material of the protuberance 32 will be caused to conform to the configuration of the bevel portion 38, whereby the excess material represented by the annular portion 32 will be extruded or deflected into the partially confined area defined between the chamfered portion 38, the under surface of the flange 33 and the leg 34 of the mounting ring.

It will thus be appreciated that the material confined within the previously described space will be under extreme pressure, effecting a fluid tight seal between the bladder assembly and the pressure vessel. The tightness of this seal, which is in part due to the extreme degree of compression of the confined portions of the thickened rim of the bladder, is, in a measure, due to the direction of inclination of the chamfered portion 38. Concomitantly, tightening of the cap assembly will cause the upwardly projecting portion 29 of the elastomeric bladder assembly to be compressed within the complementally shaped groove 40 in the under surface of the cap, providing an augmented seal at the interface between the noted parts.

It will thus be understood that there is provided an accumulator device wherein an extremely effective seal is provided between the cap and the pressure vessel and between the bladder assembly and the pressure vessel without the use of O-rings. Additionally, the axial movements inherent in initially positioning the bladder within the pressure vessel, since they provide substantial clearance between metal and elastomeric parts in the unstressed condition of the parts, avoid the risk of shearing which is attendant upon the use of O-rings.

The embodiment of FIG. 4 differs from the previously described embodiment essentially in that the cap component 50 is fusion welded as at 51 to an annular retainer nut portion 52 molded in situ into the thickened portion 53 of the bladder assembly 54. Accordingly, the seal provided by the upwardly directed annular projection 29 in the previously described embodiment is unnecessary in the embodiment of FIG. 4.

In all other respects, the operation and sealing effects achieved through the use of the embodiment of FIG. 4 are identical to those of the previously described embodiment.

From the foregoing description it will be recognized that there is provided a low cost accumulator device having a replaceable bladder assembly allowing for repair, the device obviating the necessity for using O-rings with their attendant difficulties of assembly and danger of damage thereto.

It will be appreciated by those skilled in the art that variations and modifications in details of construction may be made without departing from the spirit of the invention, and accordingly the invention is to be construed broadly within the scope of the appended claims.

Having thus described the invention and illustrated its use, what is claimed as new and is desired to be secured by Letters Patent is:

1. A pressure vessel having an oil charging port at one end and an open mouth portion at the other end, a retainer thread surrounding said open mouth portion, an annular stop shoulder formed on the interior of said vessel in proximate spaced relation to said open mouth portion, an annular bevel area of lesser diameter than said shoulder formed on an interior wall of said vessel, said bevel area forming a downward continuation of said shoulder and tapering inwardly toward the axis of said vessel, a bladder assembly comprised of resilient elastomeric material disposed within said vessel, said assembly including a thickened rim portion, an annular metallic retainer ring member bonded to said thickened rim portion, said retainer ring including a flange projecting radially beyond said rim portion and a depending cylindrical stem, the peripheral portion of said rim between said flange and said stem being inclined toward the axis of said vessel at an angle substantially matching the angle of said bevel portion, said thickened rim portion, in the unstressed condition thereof, including an annular band projecting radially outwardly therefrom at a position intermediate said inclined peripheral portion, a cap assembly mounted in said mouth portion and including a thread section engaging said retainer thread and a depending shoulder, said cap assembly being complementally threaded into said retainer thread and clamping said retainer ring against said stop shoulder, said annular band of said rim portion, in said clamped position of said cap assembly, being deformed into conforming relation with said bevel area, the elastomeric material of said thickened rim, in the area bounded by said bevel portion, said flange and said stem of said retainer ring, being of greater density in said clamped than in said unstressed condition.

2. A pressure vessel in accordance with claim 1 wherein said thickened rim of said bladder includes an upwardly directed annular lip member, said lip member being stressed against the under surface of said cap member in the mounted position of said cap member.

3. A pressure vessel in accordance with claim 2 wherein said cap member includes a downwardly directed annular groove and said lip is seated under pressure in said groove in said mounted position of said cap member.

4. A pressure vessel having an oil charging post at one end and an open mouth portion at the other end, a retainer thread surrounding said open mouth portion, an annular stop shoulder formed on the interior of said vessel in proximate spaced relation to said open mouth portion, an annular bevel area of lesser diameter than said shoulder formed on an interior wall of said vessel, said bevel area forming a downward continuation of said shoulder and tapering inwardly toward the axis of said vessel, a bladder assembly comprised of resilient elastomeric material disposed within said vessel, said assembly including a thickened rim portion, an annular metallic retainer ring member bonded to said thickened rim portion, said retainer ring including a flange projecting radially beyond said rim portion and a depending cylindrical stem, said thickened rim portion, in the unstressed condition thereof, including an annular band projecting radially outwardly therefrom, a cap assembly mounted in said mouth portion and including a thread section engaging said retainer thread and a depending shoulder, said cap assembly being complementally threaded into said retainer thread and clamping said retainer ring against said stop shoulder, said annular band of said rim portion, in said clamped position of said cap assembly, being deformed into conforming relation with said bevel area, the elastomeric material of said thickened rim, in the area bounded by said bevel portion, said flange and said stem of said retainer ring, being of greater density in said clamped than in said unstressed condition.

* * * * *